United States Patent [19]

Ryu

[11] Patent Number: 5,442,452
[45] Date of Patent: Aug. 15, 1995

[54] SOUND MODE SWITCHING METHOD FOR MULTICHANNEL SELECTION AND DEVICE THEREOF

[75] Inventor: Jae-chun Ryu, Seoul, Rep. of Korea

[73] Assignee: SamSung Electronics Co., Ltd., Kyungki, Rep. of Korea

[21] Appl. No.: 931,425

[22] Filed: Aug. 24, 1992

Related U.S. Application Data

[63] Continuation of Ser. No. 398,904, Aug. 28, 1989, abandoned.

[30] Foreign Application Priority Data

Dec. 8, 1988 [KR] Rep. of Korea ............... 88-20496

[51] Int. Cl.⁶ .................. H04N 5/76; H04N 7/04; H04N 5/262; H04N 5/272
[52] U.S. Cl. ............................ 358/335; 348/462; 348/484; 348/565; 348/588; 348/734
[58] Field of Search ................ 358/143, 903; H04N 7/04, 5/262, 5/272, 5/76, 9/79; 348/564, 565, 566, 567, 568, 588, 705, 734, 462, 484

[56] References Cited

U.S. PATENT DOCUMENTS

| | | | |
|---|---|---|---|
| 4,358,791 | 11/1982 | French | 358/193.1 |
| 4,399,329 | 8/1983 | Wharton | 358/144 |
| 4,472,830 | 9/1984 | Nagai | 358/144 |
| 4,486,897 | 12/1984 | Nagai | 358/144 |
| 4,489,351 | 12/1984 | d'Alayer de Costemore d'Arc | 358/209 |
| 4,677,488 | 6/1987 | Zato | 358/181 |
| 4,729,027 | 3/1988 | Hakamada et al. | 358/183 |
| 4,768,093 | 8/1988 | Prodan | 358/22 PIP |
| 4,774,582 | 9/1988 | Hakamada et al. | 358/183 |
| 4,845,564 | 6/1989 | Hakamada et al. | 358/183 |
| 4,907,082 | 3/1990 | Richards | 358/194.1 |

FOREIGN PATENT DOCUMENTS

| | | | |
|---|---|---|---|
| 0271055 | 12/1987 | European Pat. Off. | |
| 58-59673 | 4/1983 | Japan | 358/22 PIP |
| 60-242781 | 12/1985 | Japan | |
| 62-272679 | 11/1987 | Japan | |

Primary Examiner—Tommy P. Chin
Assistant Examiner—Thai Tran
Attorney, Agent, or Firm—Robert E. Bushnell

[57] ABSTRACT

A sound mode switching method for multichannel selection a video tape recorder uses a first step of making judgements on the selections of a multi-voice mode setting key and a main picture switching key, a second step for deciding the sound mode and for storing the sound mode data into a memory, a third step for making a judgement on the selection of a channel for the main picture and for outputting the selected multi-voice mode signals, and a fourth step for replacing the sub-picture. A device for multichannel selection comprises a microcomputer, a multi-voice mode selecting circuit, and a multi-voice module. According to the present invention, during a multichannel selection, independent sound signals can be outputted for the respective channels under a multi-voice mode and therefore, different sound signals can be displayed and enjoyed in a unique manner depending on the contents of the pictures for the respective channels.

19 Claims, 2 Drawing Sheets

SOUND MODE SWITCHING METHOD FOR MULTICHANNEL SELECTION AND DEVICE THEREOF

This is a continuation of application Ser. No. 07/398,904 filed on Aug. 28, 1989 now abandoned.

FIELD OF THE INVENTION

The present invention relates to a sound mode switching method for multichannel selection and a device thereof, in which, in carrying out a multichannel selection, a selected multi-voice mode can be outputted to each of the channels after setting a multi-voice mode for each of the channels in multichannel selection type multi-picture video tape recorder.

BACKGROUND OF THE INVENTION

A PIP (picture-in-picture) TV is indicative of a television which is capable of displaying a stationary or moving sub-picture within the main picture as a part of it, which is rendered possible with the digitalization of the processing of image signals.

In such a PIP TV, first a picture can be displayed as the main picture through a tuner, and then, a moving or stationary picture from non-broadcast video sources such as VTR can be displayed as sub-pictures. Subsequently, a technique for swapping the sources of the main and sub-pictures was developed, and also, a system capable of simultaneously receiving two off-air broadcast video sources, namely a 2-tuner system, was developed.

Recently, the digitalization of the processing of video signals has been promoted more in order to process and display diversified video signals from the video signal origins such as public broadcasts, VTR, CATV, Video disc players or video cameras.

The digital tuner which has appeared in conformity with such trends is capable of receiving simultaneous video signals from a plurality of broadcasting sources, and is capable of outputting them after multiplexing them, so that a plurality of broadcasting can be simultaneously displayed on the TV screen. This technique, when applied to the PIP TV is called a multiple PIP(M-PIP).

Such a multiple PIP TV can display a plurality of sub-pictures within a main picture, and therefore, can show various new functions which are not seen in the more conventional PIP TV. One of the new functions is the multichannel scanning function wherein the digital signals from the digital tuner can be successively outputted, so that programs broadcast by different broadcasting stations or programs outputted from different video signal sources can be scanned, thereby performing the multichannel scanning function.

The conventional multichannel scanning method of such a multiple PIP TV was adopted, for example, by Matsushita Electric Company of Japan in its Hi-Fi VTR "NV-D21" sold on Dec. 1, 1986 (refer to the Journal Video Saloon, Dec. 1986, P 139).

In this method, first, the user manipulates the ten keys to input the channel to be scanned and to store the data into the system, and then, the user presses the channel scan key to set a plurality of sub-pictures on the screen. At the same time, the system successively writes into and reads the video signals for the selected and memorized channel from the relevant memory, so that the stationary images for the memorized channels are outputted to the respective sub-pictures, thereby performing the multi-channel scanning.

When selecting channels (when selecting screen multiplex broadcasting channels so as to assure a plurality of sub-pictures within a main picture) in the conventional multichannel scanning method, each of the channels can not be assigned to an independent multi-voice mode, but the sound signals are outputted based on the sound mode selected for the main picture.

That is, in the case where a sub-picture is displayed like a main picture, the sound signal will be outputted based on the sound mode selected for the basic main picture, with the result that the sound mode is fixed to be unvariable even in the case of a multichannel selection.

Accordingly, the diversification of the picture is attainable through a multichannel, but the diversification of sound modes can not be expected.

SUMMARY OF THE INVENTION

It is the object of the present invention to provide a sound mode switching method for multichannel selection and a device thereof, wherein an independent multi-voice mode is outputted to each of the selected channels by setting a multi-voice mode to each of the selected channels during a multichannel selection, so that the sound mode switches over depending on the selection of the channels for both main and sub-picture.

In achieving the above object, the sound mode switching method of present invention includes;

a first step for making a judgement on the selection of the multi-voice mode setting key, and on the selection of the main picture switching key;

a second step for deciding the sound mode for selected channel by means of a language selecting key upon finding the selection of a multi-voice mode setting key under the first step, and for storing the decided sound mode data into a memory corresponding to the selected channel;

a third step for making a judgement as to which channel for displaying the main picture is selected by the main tuner each time an audio selecting key is selected after the selection of all the channel sound modes at the second step, and for outputting the selected multi-voice mode signals by means of a language selecting key; and a fourth step for replacing the sub-picture by supplying a strobing stop release data to the sub-picture-selecting sub-tuner after carrying out the third step, The device which is most suitable for carrying out the sound mode switching method of the present invention includes;

a microcomputer for memorizing the multi-voice mode states for the respective channels upon pressing of a function key;

a multi-voice mode selecting means for selecting a multi-voice mode in response to a multi-voice mode selecting signal outputted by the microcomputer upon recognition of the pressing of an audio selecting key for change-over of the main picture channel; and a multi-voice module for selecting multi-voice audio signals through the multi-voice mode selecting means.

BRIEF DESCRIPTION OF THE DRAWINGS

The above object and other advantages of the present invention will become more apparent by describing in detail the preferred embodiment of the present invention with reference to the attached drawings wherein.

DESCRIPTION OF THE PREFERRED EMBODIMENT

Figure 1:
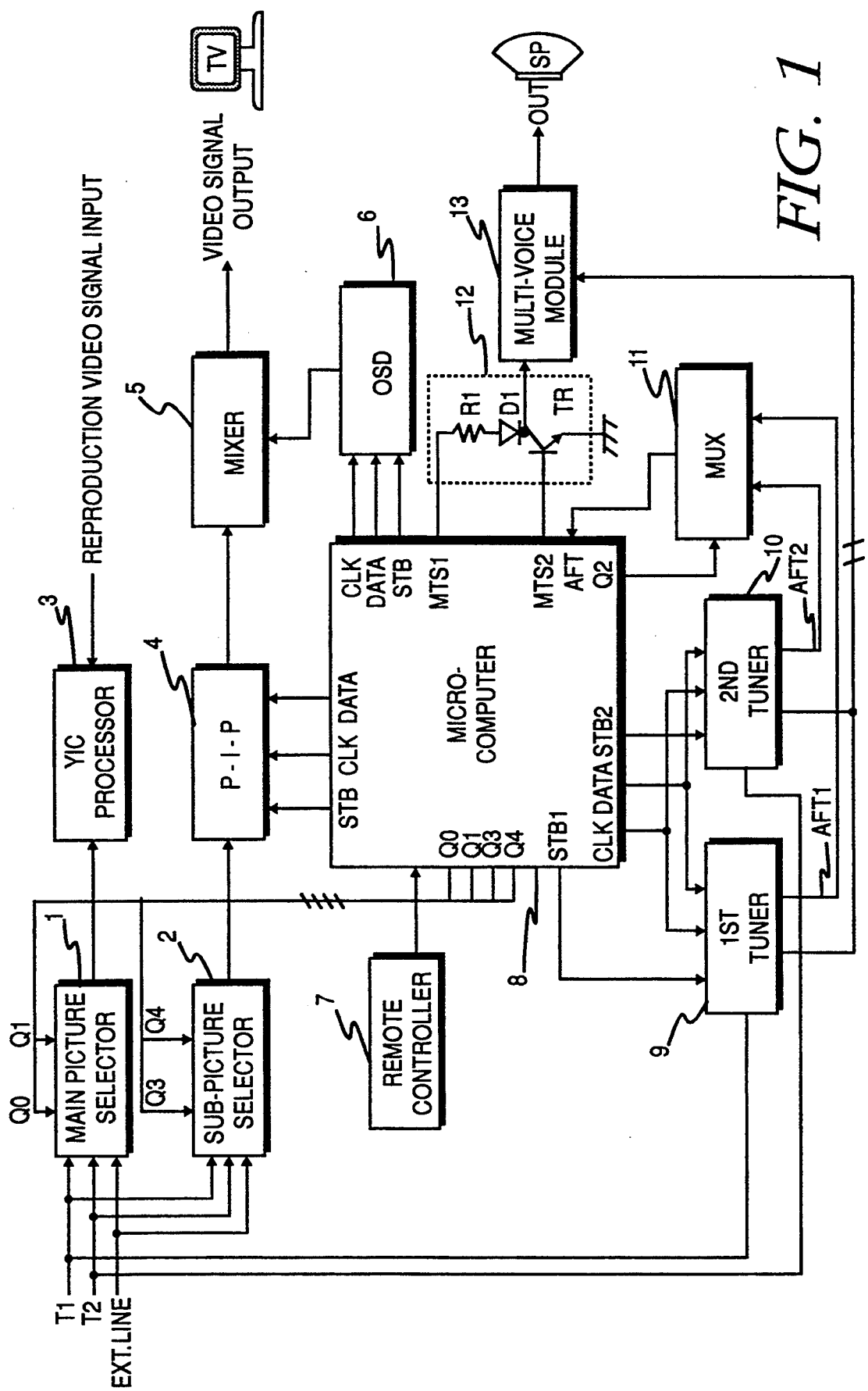
FIG. 1 schematically illustrates a device which is most suitable for carrying out the sound mode switching method of the present invention.

FIG. 1 illustrates a sound mode switching device according to the present invention, in which the signals for the main picture selected by an input selecting means 1 are supplied to a Y/C separating means 3, and then, are supplied to a PIP processing means 4 in the form of the final main picture signals in accordance with the inputting of regeneration video signals. Meanwhile, the PIP processing means 4 outputs the sub-picture signals selected by an output selecting means 2 in the form of a multi-image (main picture+sub-pictures) in accordance with the controls of a microcomputer 8.

The control signals from a remote control let are amplified by a preamplifier within a receiver 7, and then, are supplied to the microcomputer 8. The microcomputer 8 is constituted such that it supplies clocks, data and strobing signals STB1,STB2 to first and second tuners 9,10 which are used for applying multiple channels on a single picture. Meanwhile, AFT signals (automatic fine tuning signals) from the first and second tuners 9,10 which are controlled by the strobing signals are supplied to a multiplexer 11, and are selected by control signals 2 outputted from the microcomputer 8.

The output signals of an OSD (on screen display) controller 6, which outputs character signals upon receipt of clocks and data from the microcomputer 8, are supplied to a mixer 5 to be outputted overlappingly with the multi-image signals of the PIP processing device 4.

A sound control terminal MTS2 of the microcomputer 8 is connected to the base of a transistor TR1, and another sound control terminal MTS1 of the microcomputer 8 is connected in series to a resistance R1, a diode D1, and the collector of a transistor TR1, all of these constituting a multi-voice mode selecting means 12, while the output of the collector of the transistor TR1 is supplied to a multi-voice module 13, so that multi-voice module 13 will output multi-voice modes.

That is, in accordance with the selection of channels from among the multiple channels, the outputs of the sound control terminals MTS1,MTS2 are varied depending on the sound modes of the respective channels, and these outputs are inputted into the multi-voice module 13 in the form of a low level, a high level or a high impedance state through the control of the driving of the transistor TR1, so that, if a low level signal is inputted into the multi-voice module 13, the native language will be outputted, and if a high level signal is inputted, a foreign language will be outputted while, if TR1 a high impedance state, the native language+a foreign language will be outputted.

Thus, according to the method of the present invention, the multi-voice mode outputted from the multi-voice module 13 are varied depending on the selected channels during a multichannel selection.

Figure 2:
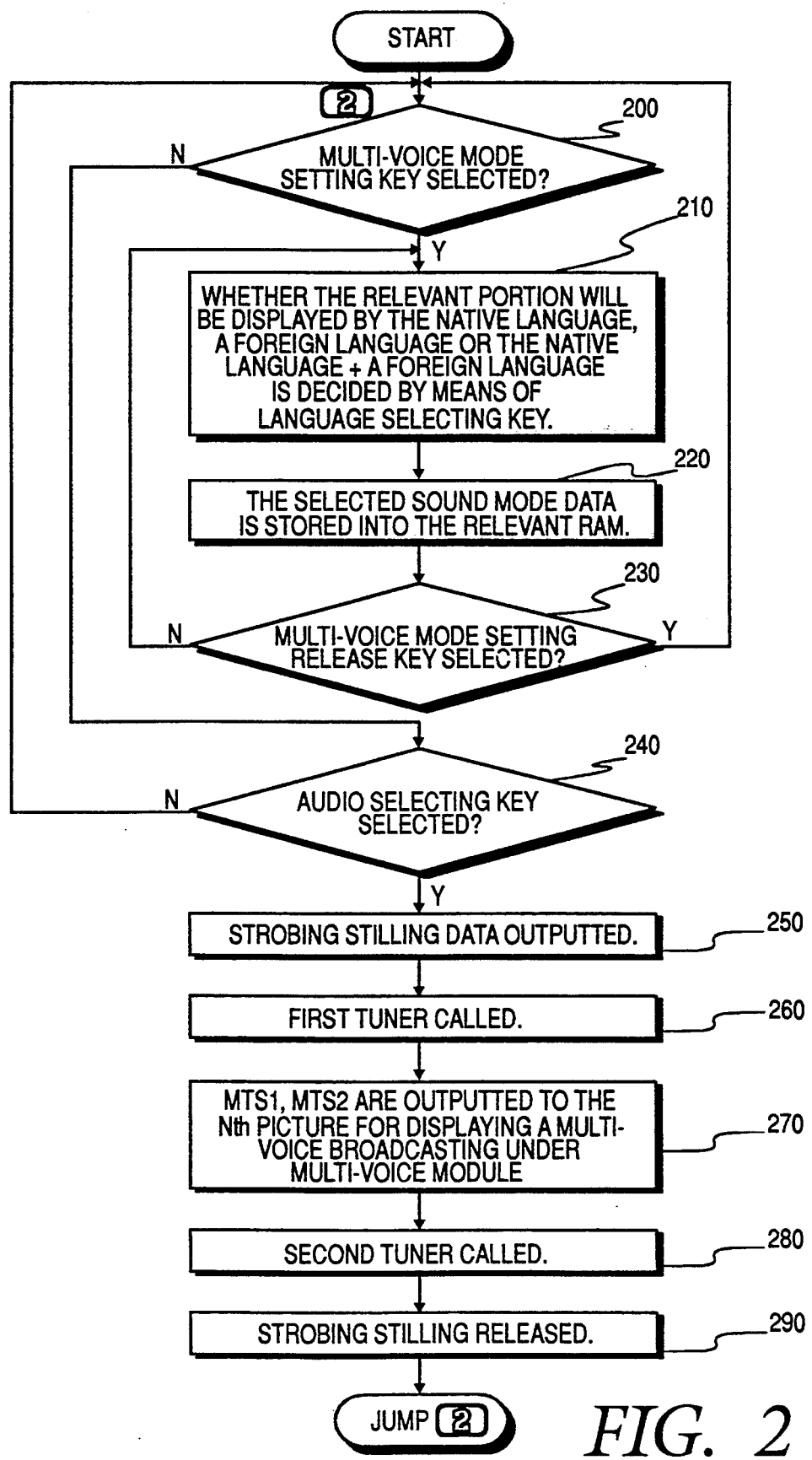
FIG. 2 is a flow chart of the operation of the sound mode switching device according to the present invention.

FIG. 2 illustrates a flow chart of the sound mode switching circuit according to the present invention. According to this drawing, first, the multi-voice mode for the relevant channel is selected by pressing the multi-voice mode setting key to store it to into a RAM, then a strobing stilling data is outputted by pressing an audio selecting key, the first tuner 9 is selected as the main picture, and the data stored by the multi-voice mode setting key is outputted through the sound control terminals MTS1,MTS2, thereby displaying the relevant multi-voice broadcasting.

After carrying out the above process, the operation is turned to the second tuner 10, wherein the strobing stilling state is released, and a judgement is made as to the pressed state of the multi-voice mode setting key. The word "strobing" is indicative of a state, wherein moving sub-pictures and still sub-pictures are alternately replaced from among N sub-pictures. The word "strobing stop state" is indicative of a state, wherein a moving sub-picture is not being replaced.

The program equivalent to the flow chart of FIG. 2 is stored in the microcomputer of FIG. 1. According to this flow chart, the multi-voice modes for the respective channels are selected by pressing the respective mode keys, and if the main picture is selected by stopping the strobing by means of an audio selecting key, then the outputs of the sound control terminals MTS1,MTS2 selected for different channels are controlled to change the inputted impedance value of the multi-voice module 13, so that the multi-voice mode first selected should be adopted.

The sound mode switching device according to the present invention will now be described in terms of its operations.

In FIG. 1, the PIP processing device 4 receives the main picture signals finally selected by the Y/C separating device 3 and the sub-picture signals outputted from the output selecting device 2, and combines them with the clocks from the microcomputer 8 to output multi-image signals of main picture+sub-pictures in the form of serial data. A the inputting of the serial data, only when a strobing signal; in the form of a pulse is supplied, the PIP processing device 4 recognizes the serial data as the normal data, and performs the above operation.

The input selecting device 1 and the output selecting device 2 will select one of the inputted signals (lines T1,T2) in accordance with control signals Q1,Q2,Q3,Q4 outputted from the microcomputer 8, supplies it partly to the Y/C separating device 3 as main picture signals, and supplies it partly to the PIP processing device 4 as sub-picture signals.

The Y/C separating device 3 is for supplying the final main picture signals to the PIP processing device 4, and if regeneration video signals are not supplied, then the main picture signals from the input selecting device 1 are supplied to the PIP processing device 4, while, if regeneration video signals are supplied, then the regeneration video signals are outputted to the main picture, Further, in order to provide multiple channels to a single picture, the first and second tuners 9,10 are used, and the selection of a channel is decided by the clock and serial data supplied from the microcomputer 8, while the selection from among the first and second tuners 9,10 is decided by the supplied strobing signals STB1,STB2. The multiplexer 11 is for use in the AFT (auto fine tuning ) of the first and second tuners 9,10; and the "AFT of the first tuner 9 and the AFT of the second tuner 10 are decided by the control signal Q2 outputted from the microcomputer 8.

The receiver 7 which is connected to the microcomputer 8 amplifies the control signals from the remote controller to supply them to the microcomputer 8, so that the microcomputer 8 can decode the signals to make a judgement on the key manipulations of the remote controller and execute a proper action.

The function key manipulation signals from the remote controller are supplied to the microcomputer 8, in order to control all the operations of the microcomputer 8. The OSD controller 6 prepares character data upon receipt of clocks, serial data and strobing signals from the microcomputer 8 in order to overlappingly display character signals on the picture outputted by the PIP processing device 4, the preparation of the character data being done at the mixer 5 so that the characters should be displayed at a side of the picture.

That is, the mixer 5 overlappingly mixes the multi-picture signals of the PIP processing device 4 and the character signals of the OSD controller 6 so that multi-picture signals having OSD characters should be outputted. In such a multichannel selecting video tape recorder, the outputs of the sound control terminals MTS1,MTS2 of the microcomputer 8 are governed by the flow chart of FIG. 2.

That is, the microcomputer 8 detects the pressing of the multi-voice mode setting key at the block 200, and if it is not pressed, the microcomputer 8 detects the pressing of the audio selecting key which changes the main picture each time it is pressed. If even this audio selecting key is not pressed, the above operation is repeated. On the other hand, if the multi-voice mode setting key is pressed at block 200, then the user will choose the sound mode for the selected channel through the language selecting key at block 210, and the decided sound mode data is stored into the RAN corresponding to the selected channel as shown by block 220.

After choosing the sound mode for the selected channel and after the data is stored based on the above described process, the pressing of the multi-voice mode setting release key is detected at the block 230, and if the release key is not pressed, then the sound mode selected by means of the language selecting key can be changed, while, if the release key is pressed, then a checking is made as to whether the multi-voice mode setting key is pressed.

Therefore, if the multi-voice mode setting key is pressed again, the above mentioned operation will be repeated, and thus, the respective sound mode state for multiple channel can be stored into the RAN corresponding to the selected channel.

If the sound mode for the channel is not selected in the above described process, then after all the channel sound modes are selected, the pressed state of the audio selecting key is checked at block 240. If the audio selecting key which changes the main picture at each pressing of it is pressed, then the microcomputer 8 outputs a strobing still data at block 250, and selects the main picture through the first tuner 9 at block 260.

That is, if the main picture is selected after the outputting of the strobing still data upon pressing of the audio selecting key, the microcomputer 8 makes a judgement as to which channel is selected, and outputs the sound mode data selected by the language selecting key, the outputting being made through the sound control terminals MTS1,MTS2 as shown by the block 270.

The process of selecting the multi-voice modes for the respective channels after the outputted from the sound control terminals MTS1,MTS2 will be described later.

Thus, if the sound mode signals for the main picture selected by the first tuner 9 are outputted through the sound control terminals MTS1,MTS2, a strobing stilling release data will be outputted to the second tuner 10 at the block 280, and the operation will be returned to the normal state at block 290. That is, if the sound mode signals for the main picture are outputted, then a strobing stilling release data is outputted to the second tuner 10 for selecting the sub-picture, so that the multi-channel picture should be returned to the normal state in which moving pictures are repeatedly replaced.

Accordingly, through the above described operating process, the sound control terminals MTS1,MTS2 of the microcomputer 8 will output the mode signals as shown in the table below, and such mode signals control the driving of the transistor TR1 and the diode D1 to input the logic signals of the following table to the multi-voice module (KA 2268 N;12), while the multi-voice module 13 outputs the final multi-voice modes in accordance with the inputting of the logic signals as shown in the table below.

TABLE

| MTS1 | MTS2 | Multi-voice module input terminal | Multi-voice module output terminal |
|------|------|-----------------------------------|------------------------------------|
| L | H | L | Native language |
| L | L | Zi | Native language + foreign language |
| H | L | H | Foreign language |

According to the present invention as described above, during a multichannel receiving, the sound mode states for the respective channels are set in advance, and the drivings of the transistor TR1 and the diode D1 are controlled by outputting the sound modes for the respective selected channels, while the multi-voice module 13 outputs the present multi-voice modes based on the selection of the respective channels.

As described above, according to the present invention, during a multichannel selection, independent sound signals can be outputted for the respective channels under a multi-voice mode, and therefore, different sound signals can be displayed and enjoyed in a unique manner depending on the contents of the pictures for the respective channels.

What is claimed is:

1. A sound mode switching method for multichannel selection in a picture-in-picture video device displaying a main picture and sub-pictures overlapping portions of said main picture, said method comprising:

detecting selection of a multi-voice mode setting key for enabling entrance into a multi-voice setting mode;

in response to said multi-voice mode setting key being selected, enabling user input of sound mode data indicative of multi-voice modes for at least one of said sub-pictures and said main picture by means of a language selecting key until a multi-voice mode setting release key is selected;

storing said sound mode data into memory locations corresponding to said at least one of said sub-pictures and said main picture; and enabling user selection of channels currently displayed as said sub-pictures to be thereafter displayed as said main picture in response to user selection of an audio selecting key, displaying the user selected channels as said main picture, and outputting audio signals corresponding to said user selected channels and said sound mode data.

2. A sound mode switching method according to claim 1, wherein if the selected channel is the same as said designated channel, a multi-voice module selects a multi-voice audio signal corresponding to said sound mode data for said designated channel.

3. A sound mode switching method as claimed in claim 1, further comprising:

after enabling user selection of channels currently displayed as said sub-pictures to be thereafter displayed as said main picture, providing strobe stilling data to a sub-tuner generating said sub-pictures to thereby freeze images in said sub-pictures; and after displaying the user selected channels as said main picture, updating said sub-pictures by supplying strobing stilling release data to said sub-tuner to thereby enable a moving state of said images in said sub-pictures.

4. A sound mode switching device for multichannel selection in a picture-in-picture video device, said device comprising:

a remote controller comprising at least a multi-voice mode setting key, a language selecting, a multi-voice mode setting release key and an audio selecting key;

a microcomputer responsive to said remote controller, for accessing into a multi-voice mode in response to said multi-voice mode setting key, for making selection of multi-voice modes for a selected displayed channel from a plurality of displayed channels as a mini picture and sub-pictures displayed on a screen and storing user entered sound mode data indicative of the selected multi-voice mode in a memory, until receipt of said multi-voice mode setting release key, and for enabling a change-over of visual display of the selected displayed channel from one of said sub-pictures into said main picture on said screen in response to said audio selecting key, and outputting sound mode control signals corresponding to said selected displayed channel in accordance with said sound mode data stored in said memory;

multi-voice mode selecting means for generating a multi-voice mode selecting signal in response to said sound mode control signals upon selecting change-over of said main picture; and a multi-voice module for decoding and providing multi-voice audio signals corresponding to said multi-voice mode selecting signal.

5. The sound mode switching device as claimed in claim 4, wherein said multi-voice mode selecting means varies an impedance value in accordance with the input-voice selecting signals so that a corresponding multi-voice audio signal can be selected by said multi-voice module.

6. A sound mode switching device according to claim 4, wherein said multi-voice mode selecting means generates said multi-voice mode selecting signal by enabling one of a high state, a low state and a high impedance state.

7. A sound mode switching device according to claim 6, wherein said multi-voice mode selecting means comprises a transistor receiving a first input multi-voice selecting signal at a first terminal and receiving a second input multi-voice selecting signal through a diode at a second terminal.

8. The sound mode switching device as claimed in claim 4, wherein said microcomputer is adapted for storing sound mode data indicative of a different multi-voice mode for each of said plurality of displayed channels.

9. A sound mode switching process for multichannel selection in a video tape recorder, said process comprising:

storing different selected multi-voice mode data indicative of multi-voice broadcasts for each one of a plurality of channels simultaneously displayed as a main picture and sub-pictures on a screen in response to user first operation of an input device;

making selection of channels currently displayed as said sub-pictures on said screen to be displayed as said main picture on said screen and enabling a visual display of a selected channel from one of said sub-pictures as said main picture on said screen in response to user second operation of said input device, said second operation controlling a change-over of a main picture display;

providing multi-voice selecting signals in response to the stored selected multi-voice mode data upon activation of said second operation of said input device; and providing individual multi-voice audio broadcast signals of said selected channel displayed as said main picture in response to said multi-voice selecting signals.

10. A sound mode switching method for multichannel selection in a picture-in-picture video device, said method comprising:

displaying a video picture comprising a main picture image from a first channel and a sub-picture image from a second channel, and providing for user selection of a multi-voice mode for said second channel;

upon user selection of said multi-voice mode for said second channel, storing multi-voice mode data corresponding to the selected multi-voice mode for said second channel into a memory location corresponding to said second channel;

in response to said second channel being selected to replace said first channel as said main picture image, displaying said second channel as said main picture image; and in response to said second channel being selected to replace said first channel as said main picture image, generating an output audio signal of said second channel selected in response to said multi-voice mode data stored into said memory location corresponding to said second channel.

11. A sound mode switching method according to claim 10, further comprised of converting said sub-picture image from a strobe moving state to a strobe still state thereby freezing said sub-picture image after said second channel is selected to replace said first channel as said main picture image.

12. A sound mode switching method according to claim 11, further comprised of converting said sub-picture image from said strobe still state to said strobe moving state thereby enabling a moving state of said sub-picture image after displaying said second channel as said main picture image.

13. A sound mode switching method for multichannel selection in a television set displaying broadcasting programs of respective channels, said method comprising the steps of:

detecting selection of a multi-voice mode setting key for enabling entrance into a multi-voice setting mode;

in response to said multi-voice mode setting key being selected, enabling user input of sound mode data indicative of multi-voice modes for at least one of said channels by means of a language selecting key;

storing said sound mode data into memory locations corresponding to said at least one of said channels until a multi-voice setting release key is selected; and enabling user selection of a channel currently displayed and outputting audio signals corresponding to the selected channel and said sound mode data.

14. A sound mode switching method as claimed in claim 13, further comprising:

after enabling user selection of channels currently displayed as said sub-pictures to be thereafter displayed as said main picture, providing strobe stilling data to a sub-tuner generating said sub-pictures to thereby freeze images in said sub-pictures; and after displaying the user selected channels as said main picture, updating said sub-pictures by supplying strobing stilling release data to said sub-tuner to thereby enable a moving state of said images in said sub-pictures.

15. A sound mode switching method for multi-channel selection for use in a television set displaying broadcasting channels as a main picture and sub-pictures on a screen, comprising the steps of:

accessing into a multi-voice mode in response to instructions of a multi-voice mode setting key;

making selection of sound mode indicative of different broadcasting languages for a broadcasting channel from at least one of said main picture and said sub-pictures displayed on said screen, in response to instructions of a language selecting key;

storing sound mode data of the selected sound mode into a memory, until receipt of instructions of a multi-voice mode setting release key;

making selection of broadcasting channels corresponding to said sub-pictures currently displayed on said screen to be displayed as said main picture on said screen and enabling a visual display of a selected broadcasting channel from one of said sub-pictures as said main picture on said screen, in response to instructions of an audio selecting key; and outputting multi-voice broadcast signals corresponding to said selected broadcasting channel in dependence upon said sound mode data stored in said memory.

16. The sound mode switching method as claimed in claim 15, further comprising:

after enabling user selection of broadcasting channels currently displayed as said sub-pictures to be thereafter displayed as said main picture, providing strobe still data to a tuner generating said sub-pictures to thereby freeze images in said sub-pictures; and after displaying the selected broadcasting channel from one of said sub-pictures as said main picture, updating said sub-pictures by supplying strobing release data to said tuner to thereby enable rotation of said images in said sub-pictures.

17. A sound mode switching method for multi-channel selection of a picture-in-picture processing system capable of displaying a main picture and a plurality of sub-pictures within said main picture and having a multi-voice mode of operation, comprising the steps of:

accessing into said multi-voice mode of said picture-in-picture processing system in response to a first instruction key;

making selection of sound modes for broadcast channels representative of at least one of said sub-pictures displayed on a screen and entering sound mode data indicative of multi-voice broadcasting for the respective broadcast channels in response to a second instruction key, and storing said sound mode data into a memory until receipt of a third instruction key;

making selection of broadcast channels corresponding to said sub-pictures currently displayed on said screen and interchanging a visual display of a selected broadcast channel from one of said sub-pictures as said main picture on said screen in response to a fourth instruction key; and outputting multi-voice broadcast sounds of said selected broadcast channel in accordance with said sound mode data stored in said memory, after the selected broadcast channel from one of said sub-pictures is interchanged with said main picture and displayed as said main picture.

18. The sound mode switching method as claimed in claim 17, further comprising:

after enabling user selection of broadcast channels currently displayed as said sub-pictures to be thereafter displayed as said main picture, providing strobe still data to a tuner generating said sub-pictures to thereby freeze images in said sub-pictures displayed on said screen; and after displaying the selected broadcast channel from one of said sub-pictures as said main picture, updating said sub-pictures by supplying strobing release data to said tuner to thereby enable rotation of said images in said sub-pictures.

19. The sound mode switching method as claimed in claim 17, further comprised of said sound mode data representing one of a native-language broadcast, a foreign-language broadcast and a native-plus-foreign-language broadcast of a corresponding selected broadcast channel.

* * * * *